G. T. Chapman,
Horseshoe.
No. 3,822. Reissued Feb. 8. 1870.
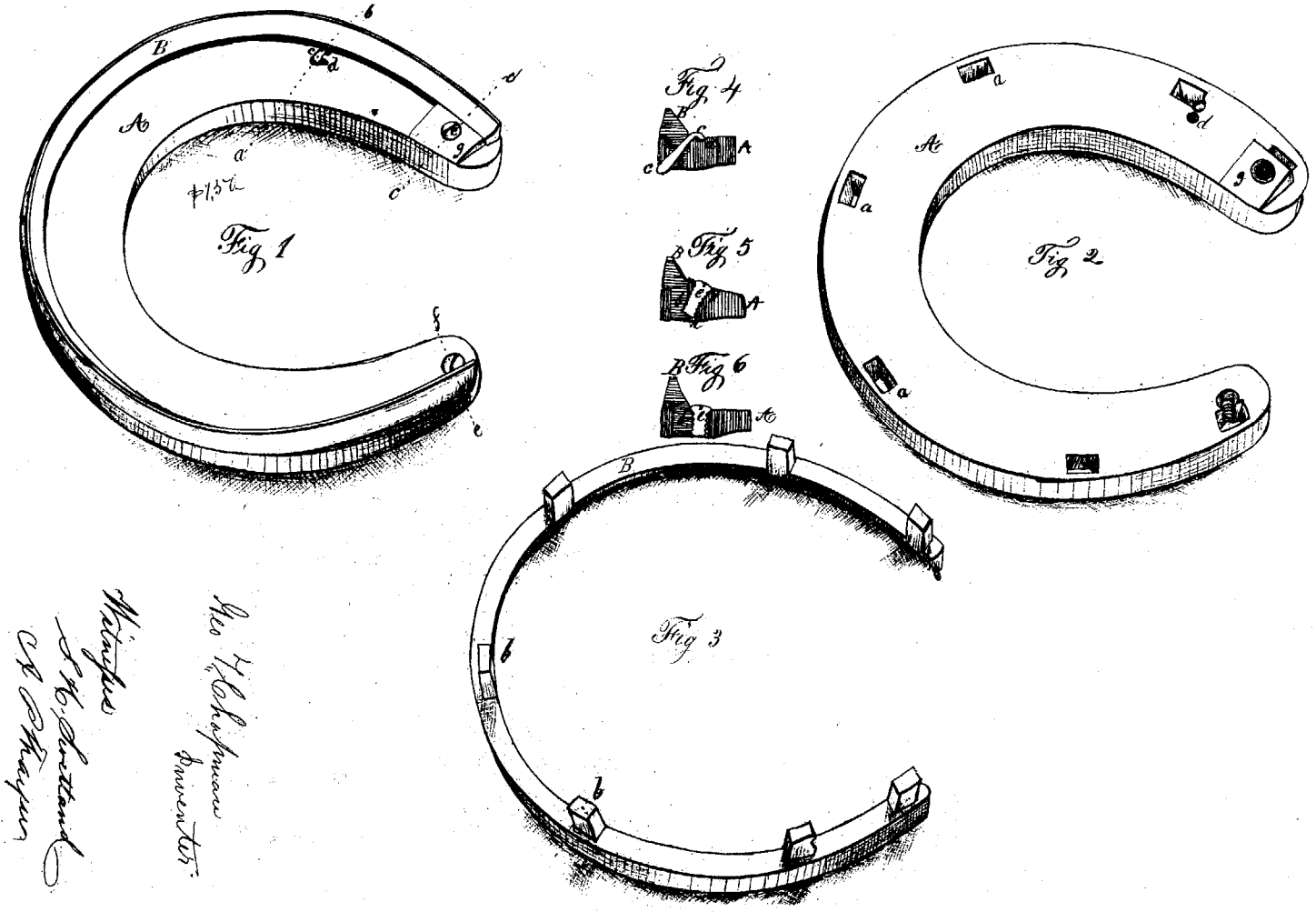
Geo T. Chapman
Inventor
Witnesses
S. H. Drettand
A. P. Thayer
N. PETERS, PHOTO-LITHOGRAPHER, WASHINGTON, D. C.

UNITED STATES PATENT OFFICE.

GEORGE T. CHAPMAN, OF NEW YORK, N. Y.

IMPROVEMENT IN HORSESHOES.

Specification forming part of Letters Patent No. 74,892, dated February 25, 1868; Reissue No. 3,822, dated February 8, 1870.

*To all whom it may concern:*

Be it known that I, GEORGE T. CHAPMAN, of New York, in the county and State of New York, have invented new and useful Improvements in Horseshoes; and I do hereby declare the following to be a full, clear, and exact description of the same, reference being had to the accompanying drawings, and to the letters of reference marked thereon.

The nature of my invention relates to the construction of horseshoes with removable calks; and it consists in an improved construction of detachable calks, also in a mode of attaching and securing detachable calks to the shoe, whereby the same may be cheaply made, and the old and worn-out calks can be easily removed and replaced by new ones without removing the shoe from the foot.

On reference to the drawings, Figure 1 represents a perspective view of my improved shoe. Fig. 2 represents the same with the calk removed. Fig. 3 represents the calk. Fig. 4 represents a section on the line *a b*, Fig. 1, showing the means of securing the calk. Fig. 5 represents a section on the line *c d*, Fig. 1, showing a modification of the means of securing the calk; and Fig. 6 represents a section on the line *e f* of Fig. 1, showing another modification of the same.

A represents the body of the shoe, which is secured to the foot by nails or screws in the ordinary manner, and having the rectangular perforations *a a*.

B is a continuous calk, preferably made of steel, having lugs *b b*, corresponding to the perforations *a* in the body portion A.

The two parts are joined together by inserting the said lugs *b* in the perforations *a*, as will be readily understood by inspection of the drawings.

The sectional view, Fig. 4, shows my improved mode of securing the two parts together.

*c* represents nails or pins driven into holes bored or punched from the outer upper edge of the shoe on the line between the lugs and the end wall of the perforations, and terminating at the vertex of the angle formed by the under side of the shoe A and the inner inclined face of the calk D, so that an equal amount of metal is removed from those parts of the lugs and the shoe bounded by one end of the perforations and the corresponding face of the lugs. I prefer to bore or punch the two parts separately, so as to give them a sufficient amount of "draw" to insure the parts being drawn tightly together.

*d* represents depressions formed in the under side of the shoe adjacent to the lower terminations of the pin-holes, into which the ends of the nails may be bent to prevent them from working loose; or they may be bent around into the angle formed by the lower face of the shoe and the calk.

One or more pins may be used for each lug, and they may be driven through the holes from the opposite direction, if preferred, and the holes may be made of the same diameter throughout, or tapering.

Figs. 5 and 6 represent modifications of my improved method of fastening the calks.

*g* is a boss, which may be raised up from the body portion of the shoe A on the under side by swaging or otherwise, the face of which is inclined, as on Figs. 1, 2, and 5, through which a hole may be tapped and countersunk at a right angle to the said inclined face, and a screw, *c'*, may be inserted, so as to bear snugly on the shoulder of a recess formed on the lug, as clearly shown at *h*, Fig. 5.

In Fig. 6 I have represented a hole tapped through the body of the shoe at the side of the lug and parallel with it, the threads being partly cut into the lug and sufficiently to hold the lug firmly in place by the screw *e*, screwed therein.

It will be observed that my improved method of attachment is adapted as well to the ordinary or single detachable toe and heel calks as to the continuous calk which I have described, and that to remove a calk requires only the withdrawal of the pins or screws, when the two parts may be easily separated. The sectional views, Figs. 1, 4, 5, and 6, show the application of these means of attachment as applied to single calks.

Having thus fully described my invention, what I claim, and desire to secure by Letters Patent, is—

1. The continuous detachable calk B, combined with the part A, substantially as specified.

2. The pins *c*, arranged and applied with the continuous or other calks, and the part A, in the manner described.

3. The screws *c'*, arranged and applied with the continuous or other calks, and the part A, substantially in the manner described.

4. The screws *e*, arranged and applied with the continuous or other calks, and the part A, substantially in the manner described.

GEO. T. CHAPMAN.

Witnesses:
FORMAN WHITNEY,
HENRY WEHLE.